(12) United States Patent
Ikeuchi et al.

(10) Patent No.: US 8,392,752 B2
(45) Date of Patent: Mar. 5, 2013

(54) SELECTIVE RECOVERY AND AGGREGATION TECHNIQUE FOR TWO STORAGE APPARATUSES OF A RAID

(75) Inventors: Kazuhiko Ikeuchi, Kawasaki (JP); Mikio Ito, Kawasaki (JP); Hidejirou Daikokuya, Kawasaki (JP); Chikashi Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 365 days.

(21) Appl. No.: 12/906,238

(22) Filed: Oct. 18, 2010

(65) Prior Publication Data
US 2011/0264949 A1 Oct. 27, 2011

(30) Foreign Application Priority Data
Oct. 19, 2009 (JP) ................................. 2009-240042

(51) Int. Cl.
*G06F 11/00* (2006.01)
(52) U.S. Cl. ..................................... 714/6.22; 714/6.32
(58) Field of Classification Search .................. None
See application file for complete search history.

(56) References Cited

U.S. PATENT DOCUMENTS

| | | | | |
|---|---|---|---|---|
| 5,258,984 A * | 11/1993 | Menon et al. | ................. | 714/6.32 |
| 6,915,448 B2 * | 7/2005 | Murphy et al. | ................. | 714/6.3 |
| 7,133,966 B2 | 11/2006 | Sato et al. | | |
| 7,136,964 B2 | 11/2006 | Yamamoto | | |
| 7,689,858 B2 | 3/2010 | Koarashi | | |
| 2003/0145166 A1 * | 7/2003 | Miwa et al. | ................. | 711/114 |
| 2006/0179345 A1 * | 8/2006 | Subbarao | ................. | 714/6 |
| 2006/0277363 A1 * | 12/2006 | Qiu et al. | ................. | 711/114 |
| 2008/0256292 A1 * | 10/2008 | Flynn et al. | ................. | 711/114 |

FOREIGN PATENT DOCUMENTS

| | | |
|---|---|---|
| JP | 7-306758 A | 11/1995 |
| JP | 2000-200157 A | 7/2000 |
| JP | 2002-297322 A | 10/2002 |
| JP | 2003-108316 A | 4/2003 |
| JP | 2005-122338 A | 5/2005 |
| JP | 2005-149374 A | 6/2005 |
| JP | 2008-040612 A | 2/2008 |
| JP | 2008-040687 A | 2/2008 |

\* cited by examiner

*Primary Examiner* — Gabriel Chu
(74) *Attorney, Agent, or Firm* — Fujistu Patent Center

(57) ABSTRACT

A disk array provided with a RAID group in a Redundant Array of Inexpensive Disks (RAID) configuration with redundancy of two, the disk array includes, a data recovery technique selecting unit to select a technique for recovering data from a first failed disk to be recovered first, the technique being selected from among a plurality of techniques based on the type of storage apparatus included in the RAID group, and I/O conditions with respect to the RAID group, when failures occur in two storage apparatus in the RAID group, a data recovering unit to split recovered data from the first failed storage apparatus and writing the recovered data to two recovery storage apparatus in accordance with the data recovery technique selected by the data recovery technique selecting unit, and an aggregating unit to aggregate the recovered data onto one of the two recovery storage apparatus.

12 Claims, 13 Drawing Sheets

| RAID GROUP NUMBER | STATUS | GROUP DISK TYPE | NUMBER OF DISKS IN GROUP |
|---|---|---|---|
| GROUP DISK NO. 1 | ... | GROUP DISK NO. n | |
| 0 | HEALTHY | HDD | 2 |
| 0010 | 0020 | - | |
| 1 | 1 DISK IN RECOVERY | SSD | 4 |
| 0030 | 0040 | 0050 | |
| 0060 | - | - | |
| : | : | : | |

216a { (rows with RAID group 0)

216b { (rows with RAID group 1)

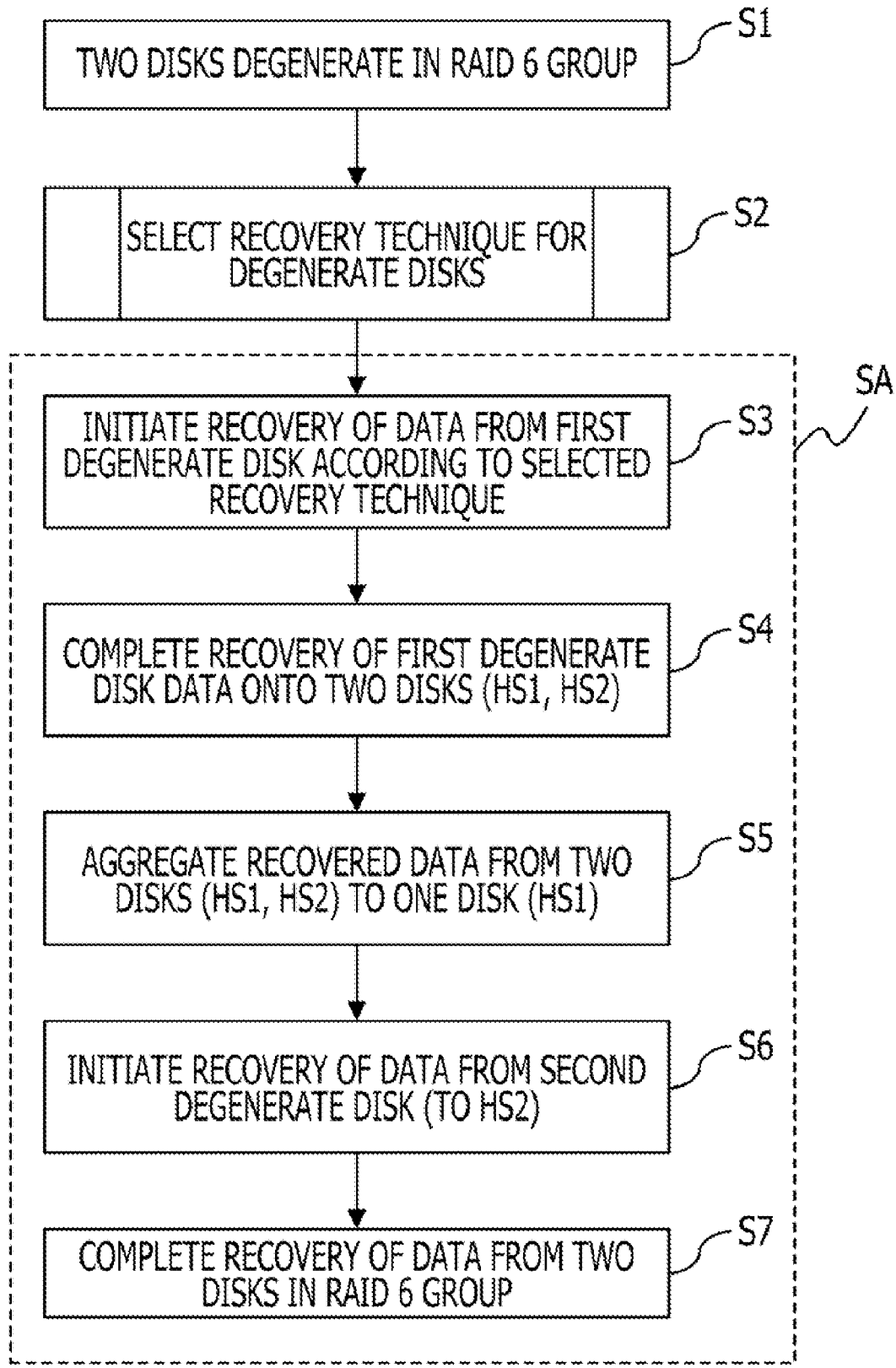

SELECTIVE RECOVERY AND AGGREGATION TECHNIQUE FOR TWO STORAGE APPARATUSES OF A RAID

CROSS-REFERENCE TO RELATED APPLICATION

This application is related to and claims the benefit of priority to Japanese Patent Application No. 2009-240042, filed on Oct. 19, 2009, the entire contents of which are incorporated herein by reference.

FIELD

Embodiments discussed herein relate to a disk array constituting a Redundant Array of Inexpensive Disks (RAID) system.

BACKGROUND

Disk arrays are established as one form of computer system storage (i.e., secondary memory apparatus). By means of RAID, faster data access and higher system reliability is realized in a disk array. RAID has multiple levels, from RAID 0 to RAID 6. Among these RAID levels, RAID 0, RAID 1, RAID 5, and RAID 6 are primarily used in disk arrays.

RAID 0 is also called striping. With RAID 0, fast data I/O is realized with the host by reading and writing data from and to multiple disks in a distributed manner. Such distributed reading and writing of data with respect to multiple disks is called "striping." The striping data units (i.e., the individual units of data written to each disk) are called blocks or stripes. In addition, the entire set of data written to multiple disks as a result of one striping operation is called a "stripe". RAID 0 offers no redundancy, with all disks being used for striping. For this reason, with RAID 0, all data is lost when a single disk fails. In other words, RAID 0 has no fault tolerance.

RAID 1 is also called mirroring, and is a technique of simultaneously writing the same data to multiple disks. With RAID 1, data is not lost unless all disks fail. For this reason, the fault tolerance is high.

RAID 5 is also called stripe sets with parity. With RAID 5, data and corresponding parity (i.e., error correcting codes for that data) is written to multiple disks in a distributed manner. With RAID 5, parity is distributed and written to each disks in a predetermined order. Since parity is distributed and recorded on multiple disks in this way, RAID 5 is also called distributed data protection. When striping in RAID 5, not only data but also parity is recorded to the disks, and thus even if a single disk fails, it is still possible to recover data from the failed disk. For this reason, even when a single disk fails, RAID 5 operation can be continued by logically separating the failed disk from the system. The state of continued RAID 5 operation in the event of a single disk failure is called a "degenerate state" (see Japanese Laid-open Patent Publication No. 2002-297322, for example). A disk array implementing RAID 5 is ordinarily provided with a spare disk drive. Once the disk array has transitioned to the degenerate state, operations are begun to restore the data on the failed disk by using the data recorded on the healthy disks. The data on the failed disk is then restored to the spare disk drive (see Japanese Laid-open Patent Publication No. 2002-297322, for example). In order to automatically recover data, it is typical for the spare disk drive to be used as a hot spare (i.e., a hot spare disk drive). In other words, the spare disk drive is typically kept powered on in a standby state (see Japanese Laid-open Patent Publication No. 2003-108316, for example).

RAID 6 is an extension of RAID 5 to increase fault tolerance. With RAID 6, two types of parity are generated when writing data to multiple disks in a distributed manner by striping. These two types of parity are respectively written to separate disks. Since two types of parity are written to separate disks in this way for distributed data protection, RAID 6 requires two redundant disks. Two techniques for generating the two types of parity in RAID 6 have been proposed: the 2D-XOR technique, and the P+Q technique. Primarily, the P+Q technique is implemented in disk arrays. In the P+Q technique, two parities called P parity and Q parity are generated and used. P parity is the same parity as that used in RAID 5. Q parity is generated by a different algorithm from P parity. With RAID 6, the two parities P and Q are respectively recorded to separate disks for distributed data protection. In so doing, it is possible to continue operation even if two disks fail at the same time. In other words, even if two disks fail at the same time, the data stored on the remaining, normally-operating disks can be used, and the data that was stored on the two failed disks can be restored. Similarly to RAID 5, the restoration of data on a failed disk in RAID 6 typically involves the use of a disk called a hot spare.

Typically, the embodiment of a particular RAID configuration is called a RAID group. In addition, the term "redundancy" is used to refer to the number of parity blocks inside a single stripe in a RAID configuration wherein data is recorded to multiple disks in a distributed manner by striping, such as in RAID 0, RAID 5, or RAID 6 (see Japanese Laid-open Patent Publication No. 7-306758, for example). According to this definition, the redundancy is "0" for a RAID group in a RAID 0 configuration. The redundancy is "1" for a RAID group in a RAID 5 configuration. The redundancy is "2" for a RAID group in a RAID 6 configuration.

Data recovery methods of the related art will now be described for the case where two disks have failed in a RAID 6 disk array. When two disks fail in a RAID 6 disk array of the related art, operation continues in the degenerate state, and the data on the two failed disks is restored to two hot spares. The data restoration in this case is conducted according to one of the following methods (1) and (2).

(1) The data on the two failed disks is restored to a hot spare in order, one disk at a time. In this case, one hot spare is used to restore the data on one of the failed disks.

(2) Restoration of the data on the two failed drives is conducted in parallel, with the data on the two failed drives taken together and then respectively restored to separate hot spares. In this case, one hot spare is used to restore the data on one of the failed disks, similarly to Method 1. However, by simultaneously using the two hot spares in parallel, the restoration of the data on the two failed disks is simultaneously conducted in parallel.

FIGS. 13A and 13B are schematic diagrams illustrating a data restoration method of the related art in the case where two disks have failed in a RAID 6 disk array. In FIGS. 13A and 13B, five disks 1001*d*-1 to 1001*d*-5 constitute a RAID 6 disk array. FIGS. 13A and 13B illustrates an example wherein the two of the five disks (1001*d*-3 and 1001*d*-4) fail, and the data on the disks 1001*d*-3 and 1001*d*-4 is respectively restored to the hot spares 1002*s*-1 and 1002*s*-2. According to the related art, when the two disks 1001*d*-3 and 1001*d*-4 fail at nearly the same time, restoration in a RAID 6 configuration is conducted according to one of the following methods. The data on the disk 1001*d*-3 may be first restored to the hot spare 1002*s*-1, and then the data on the disk 1001*d*-4 may be subsequently restored to the hot spare 1002s-2 (Method 1 discussed above). Alternatively, a process to restore the data on the disk 1001d-3 to the hot spare 1002s-1 may be conducted in parallel with a process to restore the data on the disk 100d-4 to the hot spare 1002s-2 (Method 2 discussed above).

Meanwhile, there exists a method for restoring data on a failed disk in a RAID 1 or a RAID 5 disk array by utilizing a spare parity group provided with a number of hot spares (i.e., spare drives) equal to the number of disks constituting the RAID array (see Japanese Laid-open Patent Publication No. 2003-108316, for example). There also exists a method that realizes dynamic sparing of data on two failure-prone disks (i.e., disk drives) by splitting and copying the data to two hot spares (i.e., spare disks) (see Japanese Laid-open Patent Publication No. 2005-122338, for example). Herein, dynamic sparing refers to a technique of predicting the failure probability of disks (i.e., disk drives), and then copying the data on failure-prone disks to hot spares (i.e., spare disk drives) before failure occurs. Additionally, there exists technology wherein, when a failure occurs in a disk constituting part of a disk array, data restored from the failed disk is distributed and stored on multiple spare disks by striping (see Japanese Laid-open Patent Publication No. 2008-40687, for example).

With RAID 6, when two disks fail, the data on the two failed disks is restored according to the methods described above. However, if an additional failure occurs on another disk while the restoration of data on one of the failed disks is still incomplete, data will be lost. This is because data restoration becomes impossible in RAID 6 if three or more disks fail. Consequently, when two disks have failed in RAID 6, it is necessary to quickly restore the data on one of the failed disks to a hot spare.

SUMMARY

According to an aspect of the embodiment, a disk array provided with a RAID group in a RAID configuration with redundancy of two, the disk array includes, a data recovery technique selecting unit to select a technique for recovering data from a first failed disk to be recovered first, the technique being selected from among a plurality of techniques based on the type of storage apparatus included in the RAID group, and I/O conditions with respect to the RAID group, when failures occur in two storage apparatus in the RAID group, a data recovering unit to split recovered data from the first failed storage apparatus and writing the recovered data to two recovery storage apparatus in accordance with the data recovery technique selected by the data recovery technique selecting unit, and an aggregating unit to aggregate the recovered data onto one of the two recovery storage apparatus.

The object and advantages of the embodiment will be realized and attained by at least the features, elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 illustrates one example of configuration information;

FIG. 8 is a flowchart illustrating the overall steps of a data recovery process for the case where two disks fail in a RAID 6 group;

DESCRIPTION OF THE EMBODIMENT

In the figures, dimensions and/or proportions may be exaggerated for clarity of illustration. It will also be understood that when an element is referred to as being "connected to" another element, it may be directly connected or indirectly connected, i.e., intervening elements may also be present. Further, it will be understood that when an element is referred to as being "between" two elements, it may be the only element between the two elements, or one or more intervening elements may also be present.

[System Configuration]

Figure 1:
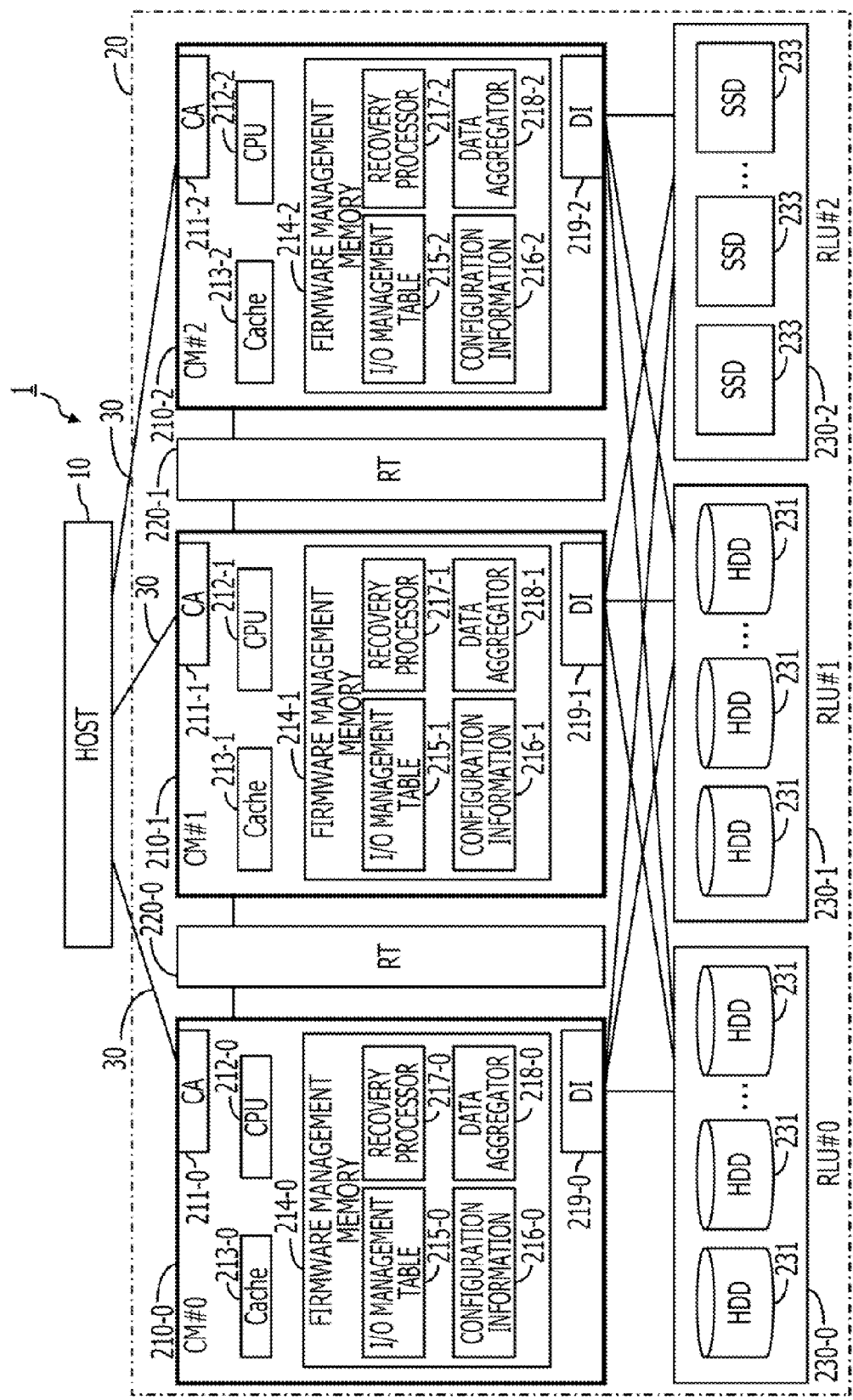
FIG. 1 illustrates the overall configuration of a computer system provided with a disk array (i.e., a disk array subsystem)

FIG. 1 illustrates the overall configuration of a computer system provided with a disk array (i.e., a disk array subsystem) in accordance with an embodiment of the present invention.

The computer system 1 illustrated in FIG. 1 is provided with a host 10 and a disk array subsystem 20. The host 10 may be a server or other computer, for example. The disk array subsystem 20 is a disk array.

The host 10 and the disk array subsystem 20 are connected by a transmission medium 30. The transmission medium 30 may be optical fiber, for example. The interface between the host 10 and the disk array subsystem 20 may be Fibre Channel, for example.

The disk array subsystem 20 is provided with three controller modules (CMs) 210-0 to 210-2 (CM#0 to CM#2), two routers (RTs) 220-0 and 220-1, as well as three RAID logical units (RLUs) 230-0 to 230-2 (RLU#0 to RLU#2). However, it should be appreciated that the disk array subsystem 20 illustrated in FIG. 1 is merely an example, and that the respective numbers of component elements provided in a disk array subsystem to which the present invention has been applied are not limited to the numbers illustrated in FIG. 1. The disk array subsystem 20 is provided with a plurality of hard disk drives (HDDs) 231 and a plurality of solid-state drives (SSDs) 233. The SSDs may be realized by flash memory, for example. In the following description of the present embodiment, the SSDs 233 will be referred to as "disks" for convenience. Each HDD 231 and each SSD 233 is assigned an individual disk number. Individual disks (i.e., individual HDDs 231 and SSDs 233) are managed by these disk numbers.

The RLUs 230-0 to 230-2 (RLU#0 to RLU#2) are the logical volumes of RAID 6 groups. The RLUs 230-0 and 230-1 are the logical volumes of RAID 6 groups made up of a plurality of HDDs 231. Meanwhile, the RLU 230-2 is the logical volume of a RAID 6 group made up of a plurality of SSDs 233. Each RAID 6 group in the RLUs 230-0 to 230-2 is assigned an individual RAID group number, and each RAID 6 group is identified and managed by its RAID group number. In the present embodiment, the RAID 6 group in the RLU 230-0 has the RAID group number "0", and the RAID 6 group in the RLU 230-1 has the RAID group number "1". Meanwhile, the RAID 6 group in the RLU 230-2 has the RAID group number "2".

The HDDs 231 and the SSDs 233 provided in the disk array subsystem 20 are classified for use in data storage (including parity storage), or for use as hot spares. The hot spare HDDs 231 or SSDs 233 may be built into the RLUs 230-0 to 230-2 in advance, or they may be shared among all RLUs (230-0 to 230-2).

The CMs 210-0 and the CM 210-1 are connected via the RT 220-0. In addition, the CM 210-1 and the CM 210-2 are connected via the RT 220-1. The RT 220-0 relays communication between the CM 210-0 and the CM 210-1, while the RT 220-1 relays communication between the CM 210-1 and the CM 210-2.

The disk array subsystem 20 of the present embodiment is configured such that a managing CM 210-$i$ is disposed with respect to the host 10 in a 1-to-1 relationship with each RLU 230 (230-1 to 230-2). During normal operation, each CM 210-$i$ (where i equals 0 to 2) manages and controls an RLU 230-$i$ (managed LUN control). The configuration and operation of a disk array subsystem that conducts RLU control using such managed LUN control is disclosed in Japanese Laid-open Patent Publication No. 2008-40612, for example.

Each CM 210-$i$ (where i is an integer from 0 to 2) is provided with the following hardware components: a channel adaptor (CA) 211-$i$, a central processing unit (CPU) 212-$i$, cache memory 213-$i$, firmware management memory 214-$i$, and a device interface (DI) 219-$i$.

The firmware management memory 214-$i$ is memory that stores information such as firmware and tables used by the firmware for control operations. The firmware management memory 214-$i$ is provided with an I/O management table 215-$i$, configuration information 216-$i$, a recovery processor 217-$i$, and a data aggregator 218-$i$. The I/O management table 215-$i$ and the configuration information 216-$i$ are a table and information, respectively. The recovery processor 217-$i$ and the data aggregator 218-$i$ are firmware executed by the CPU 212-$i$. The firmware management memory 214-$i$ may include flash memory, for example, or other types of memory such as read-only memory (ROM) and random access memory (RAM).

The I/O management table 215-$i$ is a table that stores the I/O processing request numbers for each RAID group provided in the disk array subsystem 20. The information stored in the I/O management table 215-$i$ is set by components such as the CPU 212-$i$ and the DI 219-$i$.

The configuration information 216-$i$ is information related to the status of each RAID group provided in the disk array subsystem 20, as well as information related to the disks constituting each RAID group. The recovery processor 217-$i$ is a functional component (e.g., a software module) that recovers data on failed disks in the RAID group by various techniques later described.

The data aggregator 218-$i$ is a functional component (e.g., a software module). When recovered data from a failed disk has been distributed onto two spare disks (i.e., hot spares or replacement disks) by the recovery processor 217-$i$, the data aggregator 218-$i$ aggregates that data onto one of the spare disks. Herein, a replacement disk refers to a healthy disk used to replace a failed disk. The replacement of a failed disk with a healthy disk is ordinarily performed by a hot swap. Herein, the term "spare disk" is used to collectively refer to both hot spares and replacement disks.

The CA 211-$i$ is an interface circuit that interfaces with the host 10. The CA 211-$i$ may send and receive information such as commands and data to and from the host 10 by Fibre Channel.

The CPU 212-$i$ controls the other component elements inside the CM 210-$i$, and performs overall system control of the CM 210-$i$. The cache memory 213-$i$ is memory that stores read/write data with respect to the RLU 230-$i$ managed by the CM 210-$i$. The cache memory 213-$i$ temporarily stores write data to be written to the RLU 230-$i$ specified by an I/O command received by the CM 210-$i$ from the host 10. In addition, the cache memory 213-$i$ temporarily stores read data that has been read out by the DI 219-$i$ from the RLU 230-$i$.

The DI 219-$i$ is an interface circuit that controls the RLU 230-$i$ managed by the CM 210-$i$. The DI 219-$i$ inside each CM 210-$i$ is connected to the RLUs 230-0 to 230-2 by a transmission medium, such as copper wire or optical fiber, for example. The DI 219-$i$ exchanges information such as commands and data with the RLU 230-$i$, and executes data read/writes with respect to the RAID 6 group included in the RLU 230-$i$. The interface between the CM 210-$i$ and the DI 219-$i$ may be Fibre Channel, for example.

<I/O Management Table>

Figure 2:
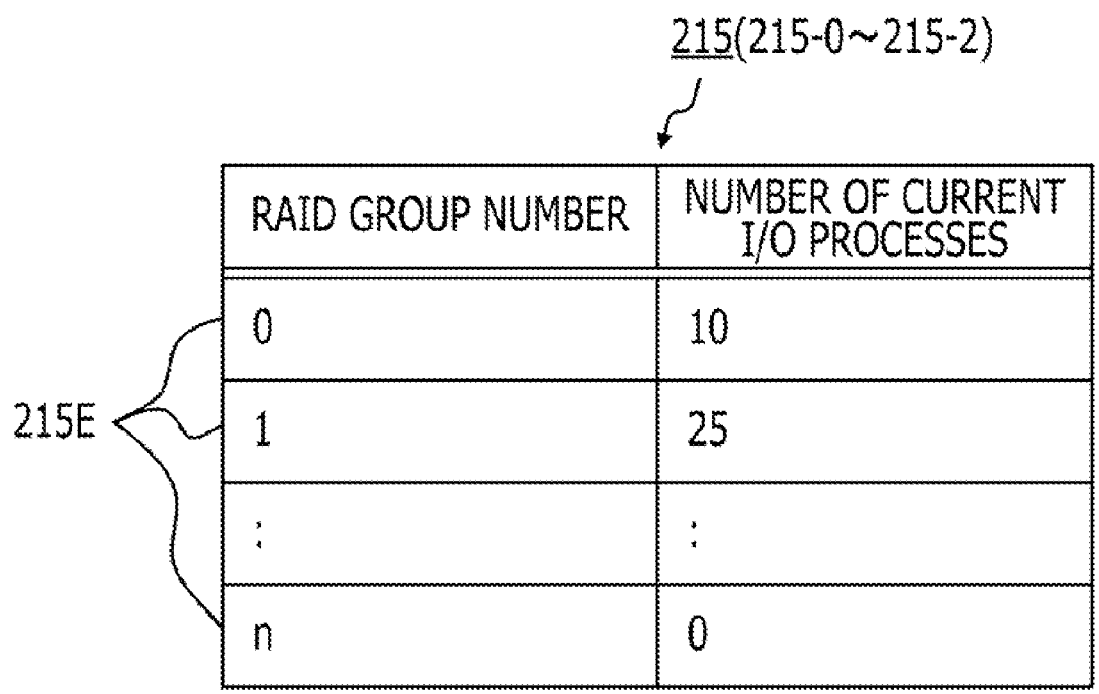
FIG. 2 illustrates one example of an I/O management table.

FIG. 2 illustrates one example of the I/O management tables 215 (215-0 to 215-2). The I/O management table 215 illustrated in FIG. 2 contains (n+1) entries. Each entry 215E in the I/O management table 215 contains two fields: "RAID group number", and "Number of current I/O processes". The RAID group number is the RAID group number of the RAID groups in the respective RLUs 230-0 to 2 described above. The number of current I/O processes is the number of I/O processes currently being processed by the RAID group with the RAID group number stored in the same entry 215E. Structured in this way, the I/O management table 215 manages the number of currently ongoing I/O processes for all RAID groups provided in the disk array subsystem 20. In the "RAID group number" field of the I/O management table 215 illustrated in FIG. 2, RAID group numbers from "0" to "n" are stored in entry order. In the first entry 215E in the I/O management table 215 illustrated in FIG. 2, a value of "0" is stored for the RAID group number, and a value of "10" is stored for the number of current I/O processes. This indicates that the RAID group with the RAID group number "0" currently has 10 ongoing I/O processes. In the next entry 215E, a value of "1" is stored for the RAID group number, and a value of "25" is stored for the number of current I/O processes. In the last entry 215E, a value of "n" is stored for the RAID group number, and a value of "0" is stored for the number of current I/O processes.

<Configuration Information>

FIG. 3 illustrates one example of the configuration information 216 (216-0 to 216-2). The configuration information 216 illustrated in FIG. 3 is configuration information for individual RAID groups provided in the disk array subsystem 20. The configuration information contains the following fields: "RAID group number", "Status", "Group disk type", "Number of disks in group", and fields from "Group disk no. 1" to "Group disk no. n". The RAID group number is the same as the RAID group number stored in the "RAID group number" field of the I/O management table 215 described earlier. The status field contains information indicating the current status of the RAID group (such as "healthy", "failure", or "1 disk in recovery", for example). The group disk type field contains information indicating whether the disk constituting part of a RAID group is an HDD or an SSD. The number of disks in group is the number of disks provided in the RAID group having the corresponding RAID group number. The group disk nos. 1 to n are disk numbers for each disk provided in the corresponding RAID group. These disk numbers i (where i equals 1 to n) are sequentially stored after the "Number of disks in group" field. The number of "Group disk no." fields is equal to the number set in the "Number of disks in group" field.

In the configuration information 216 illustrated in FIG. 3, there is illustrated configuration information for RAID groups having RAID group numbers of "0" and "1", respectively. The configuration information 216a for the RAID group having the RAID group number "0" contains the following information: the RAID group number is "0", the status is "healthy", the group disk type is "HDD", the number of disks in group is "2", and the group disk numbers are "0010" and "0020". This configuration information 216a indicates that the RAID group having the RAID group number "0" is made up of two disks (HDDs) having the disk numbers "0010" and "0020", and that currently, these two disks (HDDs) are operating normally (i.e., healthy). Meanwhile, the configuration information 216b for the RAID group having the RAID group number "1" contains the following information: the RAID group number is "1", the status is "1 disk in recovery", the group disk type is "SSD", the number of disks in group is "4", and the group disk numbers are "0030", "0040", "0050", and "0060". This configuration information 216b indicates that the RAID group having the RAID group number "1" is made up of four disks (SSDs) having the disk numbers "0030", "0040", "0050", and "0060", and that currently, data is being recovered from one of the disks (SSDs).

Overview of Method for Repairing a RAID 6 Group in the Present Embodiment

In the present embodiment, when two disks from among a plurality of disks in a RAID 6 group fail and the RAID 6 group enters a degenerate state with no redundancy, the RAID 6 group is repaired by executing the following processing sequence.

(1) Once two disks have failed in the RAID 6 group, the storage region where data recovery is required in the disk that failed earlier (the first disk) is first split into two parts: a first subregion and a second subregion of the incomplete recovery region on the first disk. Recovered data from these subregions is then split and written to two hot spares (or replacement disks).

(2) Next, the recovered data from the incomplete recovery region on the first disk that was split and stored onto two hot spares (or replacement disks) is then aggregated onto one of the hot spares (or replacement disks). In this case, the hot spare (or replacement disk) that aggregates the recovered data from the incomplete recovery region on the first disk is chosen to be the hot spare (or replacement disk) that had been storing recovered data from the complete recovery region on the first disk. In so doing, the RAID 6 can be restored to a redundant state.

(3) Subsequently, data is recovered from the disk that failed later (the second disk), and the recovered data is written to a hot spare (or replacement disk).

In the above processing sequence, the recovery data aggregation process (2) and the second disk data recovery process (3) may also be conducted at the same time in parallel.

Method for Restoring a RAID 6 Group According to the Present Embodiment

Figure 4A:
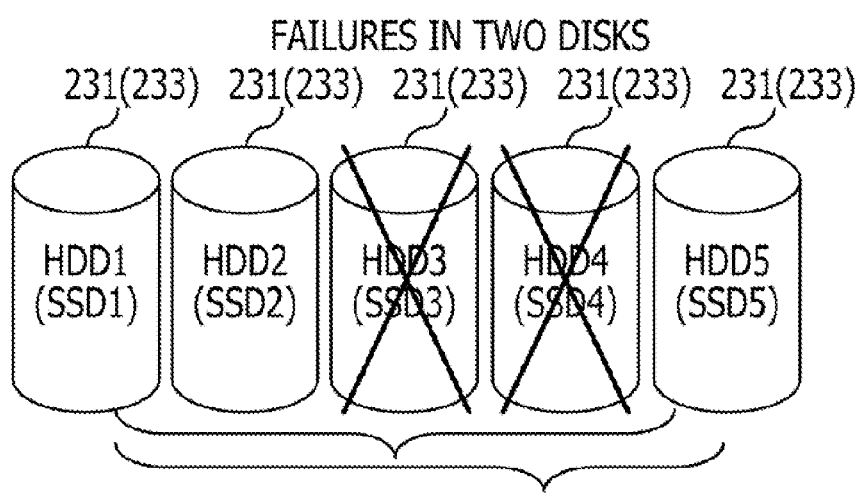
FIGS. 4A and 4B illustrate an overview of a process for restoring data on a RAID 6 group in accordance with a disk array subsystem of the present embodiment.
Figure 4B:
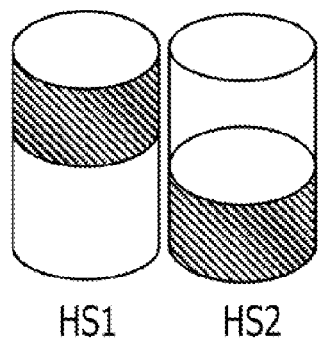

FIGS. 4A and 4B are schematic diagrams illustrating an overview of a process for restoring a RAID 6 group in accordance with the disk array subsystem 20 of the present embodiment.

As illustrated by way of example in FIGS. 4A and 4B, the RLUs 230 (230-0 to 230-2) illustrated in FIG. 1 are each assumed to be in a RAID 6 configuration made up of five disks (HDDs 231 or SSDs 233). In the present embodiment, when two disks (HDDs 231 or SSDs 233) fail in such a RAID 6 configuration, two hot spares HS1 and HS2 (or two replacement disks) are used to recover data from one of the failed disks. This process will now be described in further detail with reference to FIGS. 4A and 4B. Data from the failed disk (HDD4, in this case) is recovered on a per-stripe basis one disk at a time, and on the basis of the data stored in the remaining healthy disks (HDD1, HDD2, and HDD5, in this case). For example, HDD data may be recovered in the order HDD4, HDD5. At this point, the recovered data from one of the HDDs is split into two parts, with half of the recovered data being written to the hot spare HS1, and the remaining half of the recovered data being written to the hot spare HS2. Disks typically have poorer write performance versus read performance, with the data writing speed being slower than the data reading speed. For this reason, recovered data from the failed disk is split and written to two hot spares in parallel on a per-stripe basis. In so doing, the process to recover and store data from one of the failed disks is made faster. As a result, it becomes possible to speed up the process for restoring a RAID 6 group from a state of no redundancy (i.e., a state where data has been lost on two disks) to a state of redundancy (i.e., a state where data has been lost on only one disk). In other words, when a RAID 6 group enters a state of no redundancy, a process can be realized for repairing that RAID 6 group while shortening the period during which the RAID 6 is in a state of no redundancy.

Method for Repairing a RAID 6 Group in the Present Embodiment

Hereinafter, three types of methods will be described for repairing a RAID 6 group in the disk array subsystem 20 of the present embodiment.

In the present embodiment, when a RAID 6 group enters a state wherein two disks have failed (i.e., a degenerate state of no redundancy), the RAID 6 group is repaired by recovering data from the failed disk onto a hot spare or replacement disk. When repairing a RAID 6 group in the present embodiment, one of the following three types of data recovery techniques are used: (1) a simple split data recovery technique; (2) a consolidated split data recovery technique; and (3) a striped split data recovery technique. The technique used to repair a RAID 6 group is automatically selected according to the types of disks (HDDs or SSDs) constituting the RAID 6 group, or alternatively, according to I/O conditions in the case where the RAID 6 group is made up of HDDs.

The above three types of techniques will now be described with reference to the specific example of a RAID 6 group in a degenerate state illustrated in FIG. 4A.

<Simple Split Data Recovery Technique>

When recovering the data from the disk that failed earlier (hereinafter referred to as the failed disk data), the simple split data recovery technique involves splitting the failed disk data into an upper half and a lower half, and recovering the upper half and the lower half of the failed disk data in parallel. The recovered upper half and lower half of the failed disk data is then respectively written in parallel to a first hot spare or replacement disk as well as a second hot spare or replacement disk.

Herein, the term "single access" is used to refer to accessing one of the disks constituting the RAID group just once at a given time. The term "parallel access" is used to refer to accessing one of the disks constituting the RAID group twice at a given time. In the simple split data recovery technique, the data on one of the failed disks is split into halves and recovered on two hot spares or replacement disks. Consequently, recovery of the data on one of the failed disks requires parallel read access in order to respectively recover the upper half and the lower half of the data. Meanwhile, the writing of the recovered data to the two hot spares or replacement disks is performed by single write access. This means that the above data recovery requires parallel read access in order to recover the failed disk data. This also means that the above data recovery requires single write access in order to write the failed disk data onto two hot spares or replacement disks.

Once the recovered data has been written to the two hot spares or replacement disks, the RAID 6 group is restored to a state of redundancy.

Next, the lower half of the failed disk data is read out from the second hot spare or replacement disk, and the lower half of the failed disk data is written to the first hot spare or replacement disk. In so doing, the data that was recovered from the disk that failed earlier is aggregated onto the first hot spare or replacement disk. Subsequently, the data on the disk that failed later is recovered onto a hot spare or replacement disk using ordinary techniques.

With the simple split data recovery technique, data from a failed disk is distributed and written to two hot spares or replacement disks, and then aggregated onto a single hot spare or replacement disk. This process can be executed quickly by using sequential data read/writes.

FIGS. 5A to 5E are schematic diagrams illustrating steps in a processing sequence for the simple split data recovery technique. A data recovery processing sequence in accordance with the simple split data recovery technique will now be described in detail and with reference to FIGS. 4A and 5A to 5E. In the description hereinafter, the disks will be described as HDDs by way of example. However, it should be appreciated that the simple split data recovery technique is also applicable to disks other than HDDs.

As illustrated in FIG. 4A, a RAID 6 group is made up of five HDDs 231, of which two HDDs 231 (HDD3 and HDD4) have failed. In this case, the HDD3 has failed earlier than the HDD4.

Figure 5A:
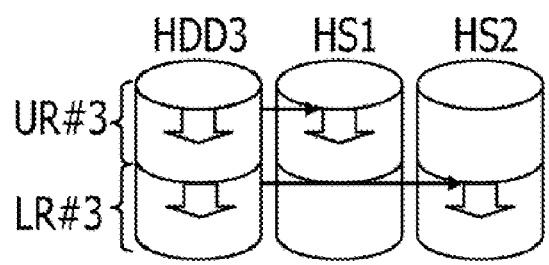
FIGS. 5A to 5E illustrate a processing sequence for a simple split data recovery technique.
Figure 5B:
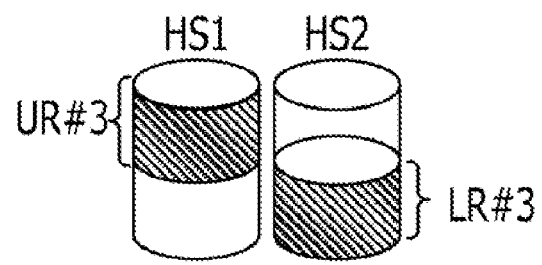

In this case, data recovery is performed first for the HDD3 and then for the HDD4. When recovering data from the HDD3, the data on the HDD3 is split into two halves. The upper half data UR#3 on the HDD3 is written to a hot spare HS1, while the lower half data LR#3 is written to a hot spare HS2 (see FIG. 5A). The upper half data UR#3 and the lower half data LR#3 on the HDD3 is then recovered on a per-stripe basis, and on the basis of data stored in the normally-operating HDDs 231 (HDD1, HDD2, and HDD5) of the RAID 6 group. In this process for recovering data on a per-stripe basis, stripe data from the upper half data UR#3 and stripe data from the lower half data LR#3 is respectively written in parallel to the hot spares HS1 and HS2. At this point, the upper half data UR#3 is written to the upper region of the hot spare HS1, while the lower half data LR#3 is written to the lower region of the hot spare HS2. FIG. 5B illustrates the state wherein all recovered data from the failed disk HDD3 has been written to the hot spares HS1 and HS2. As illustrated in FIG. 5B, recovered data from the upper half data UR#3 of the failed disk HDD3 is stored in the upper region of the hot spare HS1, while recovered data from the lower half data LR#3 of the failed disk HDD3 is stored in the lower region of the hot spare HS2.

Figure 5C:
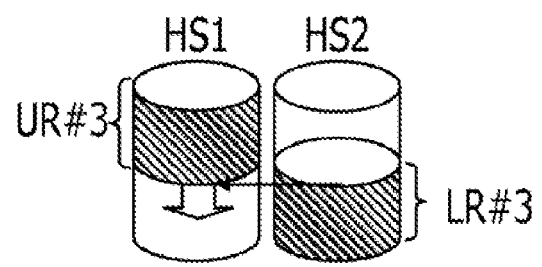
Figure 5D:
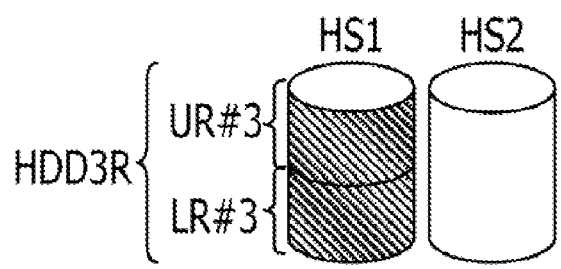
Figure 5E:
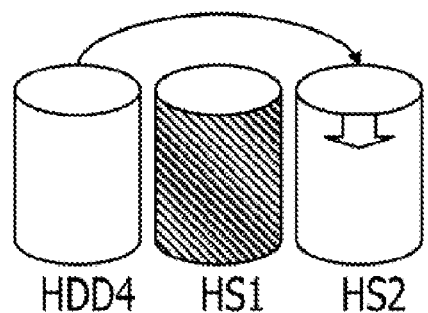

Next, the recovered data from the lower half data LR#3 of the failed disk HDD3 is sequentially read out from the hot spare HS2, and that recovered data is then sequentially written after the recovered data from the upper half data UR#3 stored in the hot spare HS1 (see FIG. 5C). In so doing, the recovered data from the lower half data LR#3 of the failed disk HDD3 that was stored in the hot spare HS2 is copied to the hot spare HS1 on a per-stripe basis. Ultimately, the data stored in hot spare HS1 and the data stored in the hot spare HS2 is aggregated onto the hot spare HS1 (see FIG. 5D). Once the recovered data from the failed disk HDD3 is aggregated onto the hot spare HS1, the hot spare HS1 is logically inserted into the RAID 6 group. In so doing, the RAID 6 group is restored to a redundant state.

Next, the process transitions to the recovery of data from the failed disk HDD4. During the recovery of data from the failed disk HDD4, recovered data from the failed disk HDD4 is recovered on a per-stripe basis, and the recovered stripe data is sequentially written to the hot spare HS2 (see FIG. 5E).

Once the writing of recovered data from the failed disk HDD4 to the hot spare HS2 is complete, the hot spare HS2 is logically inserted into the RAID 6. In so doing, the RAID 6 group is returned to normal status.

As described above, the simple split data recovery technique involves distributing and writing recovered data from a failed disk to two hot spares or replacement disks, and then aggregating the recovered data onto one of the hot spares or replacement disks. The above process can be realized by using sequential data read/writes.

<Consolidated Split Data Recovery Technique>

With the consolidated split data recovery technique, the process for recovering data from the disk that failed earlier is performed using a single access sequential read from a healthy disk in the RAID 6 group. Recovered data generated from the single read is then split into two halves, and the respective halves of the recovered data are distributed and written to two hot spares or replacement disks. For example, the upper half of the recovered data may be written to a hot spare or replacement disk, while the lower half may be written to another hot spare or replacement disk. Once the two halves of the recovered data have been completely written to the two hot spares or replacement disks, the RAID 6 group is restored to a state of redundancy at that point. Subsequently, the two halves of the recovered data are read out from the two hot spares or replacement disks, and the two halves of the recovered data are written to one of the hot spares or replacement disks. In so doing, the data from the disk that failed earlier is recovered onto one of the hot spares or replacement disks. Subsequently, the data on the disk that failed later is recovered onto a hot spare or replacement disk using ordinary techniques.

FIGS. 6A to 6E are schematic diagrams illustrating steps in a processing sequence for the consolidated split data recovery technique. A data recovery processing sequence in accordance with the consolidated split data recovery technique will now be described in detail and with reference to FIGS. 4A and 6A to 6E. In the description hereinafter, the disks will be described as HDDs by way of example. However, it should be appreciated that the consolidated split data recovery technique is also applicable to disks other than HDDs.

As illustrated in FIG. 4A, a RAID 6 group is made up of five HDDs 231, of which two HDDs 231 (HDD3 and HDD4) have failed. In this case, the HDD3 has failed earlier than the HDD4.

In the consolidated split data recovery technique, data recovery is performed first for the HDD3 and then for the HDD4, similarly to the simple split data recovery technique. When recovering data from the HDD3, data is first recovered on the basis of data obtained by single access reads from the healthy HDDs (HDD1, HDD2, and HDD5) in the RAID 6 group. This recovered data is then split into two halves, with one (upper) half of the recovered data (i.e., the first half of the recovered data) being written to a hot spare HS1, and the other (lower) half of the recovered data (i.e., the second half of the recovered data) being written to a hot spare HS2 (see FIG. 6A). A process like the above is sequentially performed for all data on the HDD3. The first half of the recovered data UD#3 for the entire HDD3 is stored in the hot spare HS1, while the second half of the recovered data LD#3 for the entire HDD3 is stored in the hot spare HS2 (see FIG. 6B).

Figure 6A:
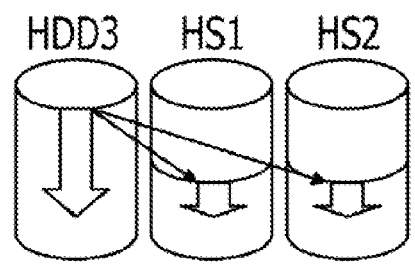
FIGS. 6A to 6E illustrate a processing sequence for a consolidated split data recovery technique.
Figure 6B:
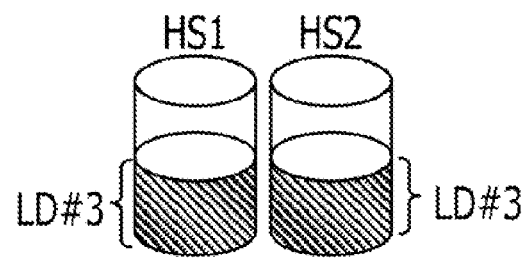
Figure 6C:
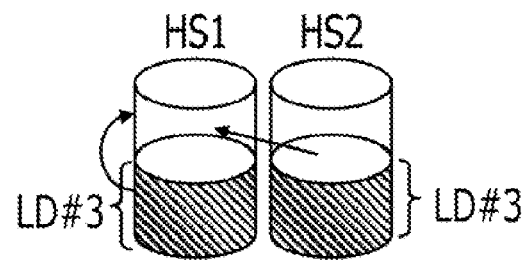
Figure 6D:
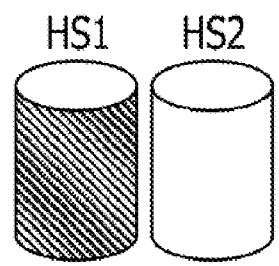
Figure 6E:
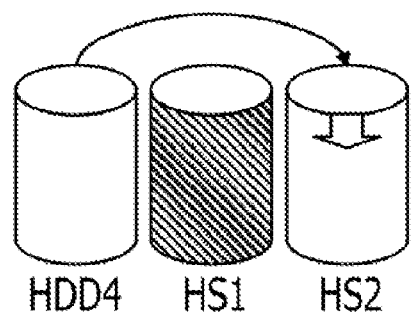

Next, the first half and second halves of the recovered data are sequentially read out in units of write blocks from the hot spares HS1 and HS2, respectively. The first and second halves of the recovered data are then aggregated by sequentially writing the data to the hot spare HS1 in alternation (see FIG. 6C). FIG. 6D illustrates the state wherein the above aggregation process has been completed. In this example, data from the failed disk HDD3 is recovered onto the hot spare HS1. Subsequently, the data on the HDD4 is recovered on the basis of data stored in the healthy HDDs (HDD1, HDD2, and HDD5) in the RAID 6 group, and the recovered data is sequentially written to the hot spare HS2 (see FIG. 6E). In so doing, the data from the failed disk HDD4 is recovered onto the hot spare HS2.

As described above, the consolidated split data recovery technique involves conducting a process for recovering data from one of the failed disks (such as the disk that failed earlier, for example). This process can be realized by using sequential, single access data reads (in other words, data is read from the healthy disks in the RAID 6 group), as well as sequential, parallel access data writes (in other words, the two halves of the recovered data are distributed and written to the hot spares HS1 and HS2).

<Striped Split Data Recovery Technique>

The striped split data recovery technique involves conducting a process for recovering data from the disk that failed first. Similarly to the consolidated split data recovery technique, this process is performed using sequential, single access reads from the healthy disks in the RAID 6 group. Recovered data that has been generated from the data obtained by one of these reads is split into two halves, and the two halves of the recovered data are then distributed and written to two hot spares or replacement disks. However, the striped split data recovery technique differs from the consolidated split data recovery technique in how the two halves of the recovered data are written to the hot spares or replacement disks. In the striped split data recovery technique, the two halves of the recovered data are written to the hot spares or replacement disks in a striped, discontinuous manner, with empty space equal to the size of one of the halves of the recovered data being left between each stripe. At this point, the two halves of the recovered data are also written to the first and second hot spares or replacement disks such that the storage locations of the respective halves on each disk are offset from each other by an amount equal to the size of one of the halves of the recovered data. In other words, the two halves of the recovered data are written such that, if empty space exists at a particular storage location in one of the hot spares of replacement disks, then one of the halves of the recovered data exists at the corresponding storage location in the other hot spare or replacement disk. Writing the two halves of the recovered data in this way simplifies the aggregation process. When recovered data that has been distributed onto two hot spares or replacement disks is subsequently aggregated onto one of the hot spares or replacement disks, the recovered data already being stored in the aggregating hot spare or replacement disk would need to be repositioned. However, by writing the two halves of the recovered data as above, this repositioning process can be eliminated. In other words, it is not necessary to move the halves of the recovered data that are already being stored in the aggregating hot spare or replacement disk. Once the recovered data has been written to the two hot spares or replacement disks, the RAID 6 group is restored to a state of redundancy.

Next, the data from the disk that failed earlier is recovered onto a hot spare or replacement disk. Subsequently, the data on the disk that failed later is recovered onto a hot spare or replacement disk using ordinary techniques.

The striped split data recovery technique involves conducting a process for recovering data from one of the failed disks (such as the disk that failed earlier, for example). This process can be realized by using sequential, single access data reads (in other words, data is read from the healthy disks in the RAID 6 group), as well as random access data writes (in other words, the two halves of the recovered data are distributed and written to the hot spares HS1 and HS2). Additionally, the process for aggregating the distributed, recovered data onto a single hot spare or replacement disk is conducted by using random data read/writes.

FIGS. 7A to 7E are schematic diagrams illustrating steps in a processing sequence for the striped split data recovery technique. In FIGS. 7A to 7E, the hot spares HS1 and HS2 are SSDs.

A data recovery processing sequence in accordance with the striped split data recovery technique will now be described in detail and with reference to FIGS. 4A and 7A to 7E. In the description hereinafter, the disks will be described as SSDs by way of example. However, it should be appreciated that the striped split data recovery technique is also applicable to disks other than SSDs.

As illustrated in FIG. 4A, a RAID 6 group is made up of five SSDs 233, of which two SSDs 233 (SSD3 and SSD4) have failed. In this case, the SSD3 has failed earlier than the SSD4.

Figure 7A:
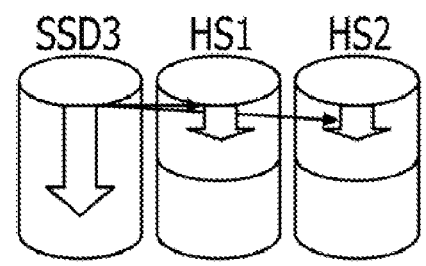
FIGS. 7A to 7E illustrate a processing sequence for a striped split data recovery technique.
Figure 7B:
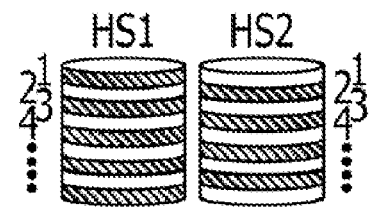

Similarly to the simple split data recovery technique, the striped split data recovery technique involves recovering data in order of the failed disks. In other words, data is first recovered from the SSD3, and then from the SSD4. When recovering data from the SSD3, data is first recovered on the basis of data obtained by single access reads from the healthy SSDs (SSD1, SSD2, and SSD5) in the RAID 6 group. This recovered data is then split into two halves, with one (upper) half of the recovered data (i.e., the first half of the recovered data) being written to a hot spare HS1, and the other (lower) half of the recovered data (i.e., the second half of the recovered data) being written to a hot spare HS2 (see FIG. 7A). At this point, the first half of the recovered data is written to the hot spare HS1 and the second half of the recovered data is written to the hot spare HS2, similarly to the consolidated split data recovery technique. However, the write positions (i.e., write addresses) for the first and second halves of the recovered data are alternated in the hot spare HS1 and the hot spare HS2. In other words, the leading first half of the recovered data is written at the address 1 in the hot spare HS1, while the leading second half of the recovered data is written at the address 2 in the hot spare HS2. Similarly thereafter, the nth first half of the recovered data is written to the address ($2n-1$) in the hot spare HS1, while the second half of the recovered data is written to the address $2n$ in the hot spare HS2 (where n equals 2, 3, 4, etc.). By sequentially performing the above process for all data in the SSD3 in order from the leading data, the upper halves of all recovered data from the SSD3 are written to the hot spare HS1, while the lower halves of all recovered data from the SSD3 are written to the hot spare HS2. FIG. 7B illustrates the state of the hot spare HS1 and HS2 after the completion of data recovery from the failed disk SSD3.

Figure 7C:
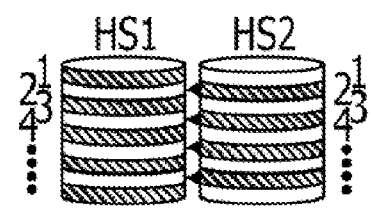
Figure 7D:
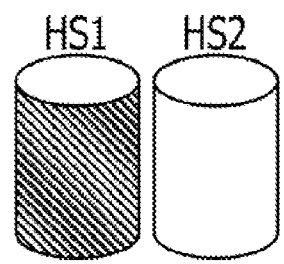
Figure 7E:
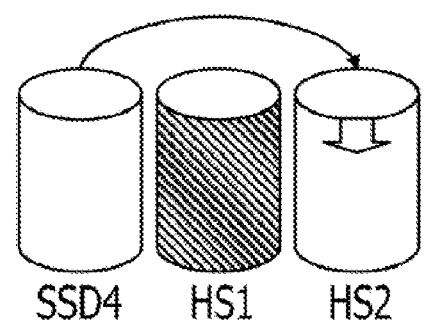

Next, the second halves of the recovered data are read out in order from the hot spare HS2, and the second halves of the recovered data thus read out is then successively written to the addresses 2, 4, 6, etc., in the hot spare HS1 (see FIG. 7C). Once the second halves of the recovered data stored in the hot spare HS2 have been written to the hot spare HS1, the process for aggregating recovered data from the SSD3 to the hot spare HS1 is complete (see FIG. 7D). In this aggregation process, the reading and writing of the second halves of the recovered data from the hot spare HS2 to the hot spare HS1 are executed by random accesses with respect to the hot spares HS1 and HS2 (i.e., every other address is accessed).

Subsequently, data from the SSD4 is recovered on the basis of data stored in the healthy SSDs (SSD1, SSD2, and SSD5) in the RAID 6 group. This recovered data is sequentially written to the hot spare HS2 (see FIG. 7E), thereby recovering data from the failed disk SSD4 onto the hot spare HS2.

As described above, the striped split data recovery technique involves conducting a process for recovering data from one of the failed disks (such as the disk that failed earlier, for example). This process can be realized by using sequential, single access data reads (in other words, data is read from the healthy disks in the RAID 6 group). In addition, a process is conducted to take data that has been recovered from one of the failed disks (such as the disk that failed earlier, for example) and subsequently distributed and stored onto two disks or replacement disks, and then aggregate that recovered data onto a single disk or replacement disk. In this aggregation process, it is not necessary to modify the arrangement of data on the aggregating disk or replacement disk. In other words, the arrangement of data on the aggregating disk or replacement disk can be used as-is.

{Method for Automatically Selecting a Data Recovery Technique in a Disk Array Subsystem (Disk Array) having a RAID 6 group with Mixed HDDs and SSDs}

A method will now be considered for automatically selecting a data recovery technique in the case where two disks of a RAID 6 group fail in a disk array subsystem (disk array) equipped with data recovery functions according to the above three types of data recovery techniques.

In the case where all disks in the RAID 6 group are realized by SSDs, the striped split data recovery technique is selected. This is because sequential access does not present particular advantages in the case of SSDs, and because a single access read command can be executed with respect to the read source disk.

In the case where all disks in the RAID 6 group are realized by HDDs, and in conditions of no I/O activity, the consolidated split data recovery technique is selected. This is because when the consolidated split data recovery technique is used to recover data from one of the failed disks (i.e., recover data from the failed disk that is to be recovered first), the read/write sequentiality of the data on the read source disk and the write destination hot spares or replacement disks can be maximized under conditions of no other I/O activity.

In the case where all disks in the RAID 6 group are realized by HDDs, and in conditions where a fixed amount of I/O activity exists, the simple split data recovery technique is selected. This is because, under such conditions, there is a minimal performance delta for data recovery from one of the disks (i.e., data recovery from the failed disk that is to be recovered first) between the simple split data recovery technique and the consolidated split data recovery technique, both of which utilize sequential access of both the read source disk and the write destination disks. For this reason, the simple split data recovery technique is selected, as it enables faster execution of the process for aggregating recovered data from a failed disk that has been distributed and recorded onto two hot spares (or replacement disks).

{Overall Process for Recovering Data in the Case where Two Disks Fail in a RAID 6 Group}

FIG. 8 is a flowchart illustrating the overall steps of a data recovery process for the case where two disks fail in a RAID 6 group. The process illustrated in FIG. 8 is primarily conducted under control by the CMs 210 (CM210-0 to CM210-2).

Two disks (HDDs 231 or SSDs 233) fail in one of the RAID 6 groups of the disk array subsystem 20, and the RAID 6 group enters a degenerate state with no redundancy (S1). When such an event occurs, the CM 210 managing that RAID 6 group selects the data recovery technique to be used with respect to the first of the two degenerate disks to be recovered (S2). This process for automatically selecting a data recovery technique in S2 will be later described in detail.

The CM 210 initiates the process for recovering data from the first degenerate disk according to the data recovery technique selected in S2 (S3). Subsequently, the CM 210 completes the recovery of data from the first degenerate disk onto two spare disks (the hot spares HS1 and HS2) (S4). Herein, a degenerate disk refers to a failed disk existing in a state of logical separation from the RAID 6 group.

Subsequently, the CM 210 takes the data that was recovered from the first degenerate disk, and aggregates the recovered data from the two spare disks (the hot spares HS1 and HS2) onto a single spare disk (the hot spare HS1) in accordance with the technique selected in S2 (S5).

By the above process, data from the first failed disks is recovered onto a spare disk (the hot spare HS1). The CM 210 then logically inserts that spare disk into the RAID 6 group. In so doing, the RAID 6 group enters a degenerate state with redundancy.

Next, the CM 210 initiates a process for recovering data from the second degenerate disk onto a spare disk (the hot spare HS2) (S6). Subsequently, the CM 210 writes all data from the second degenerate disk to the spare disk (the hot spare HS2), thereby recovering the data from the second degenerate disk onto the spare disk (the hot spare HS2). The CM 210 then logically inserts that spare disk into the RAID 6 group. In so doing, the recovery process for the second degenerate disk is completed (S7).

Once the processing in S7 finishes, the RAID 6 group is restored to a normal state.

{Process for Automatically Selecting a Data Recovery Technique}

Figure 9:
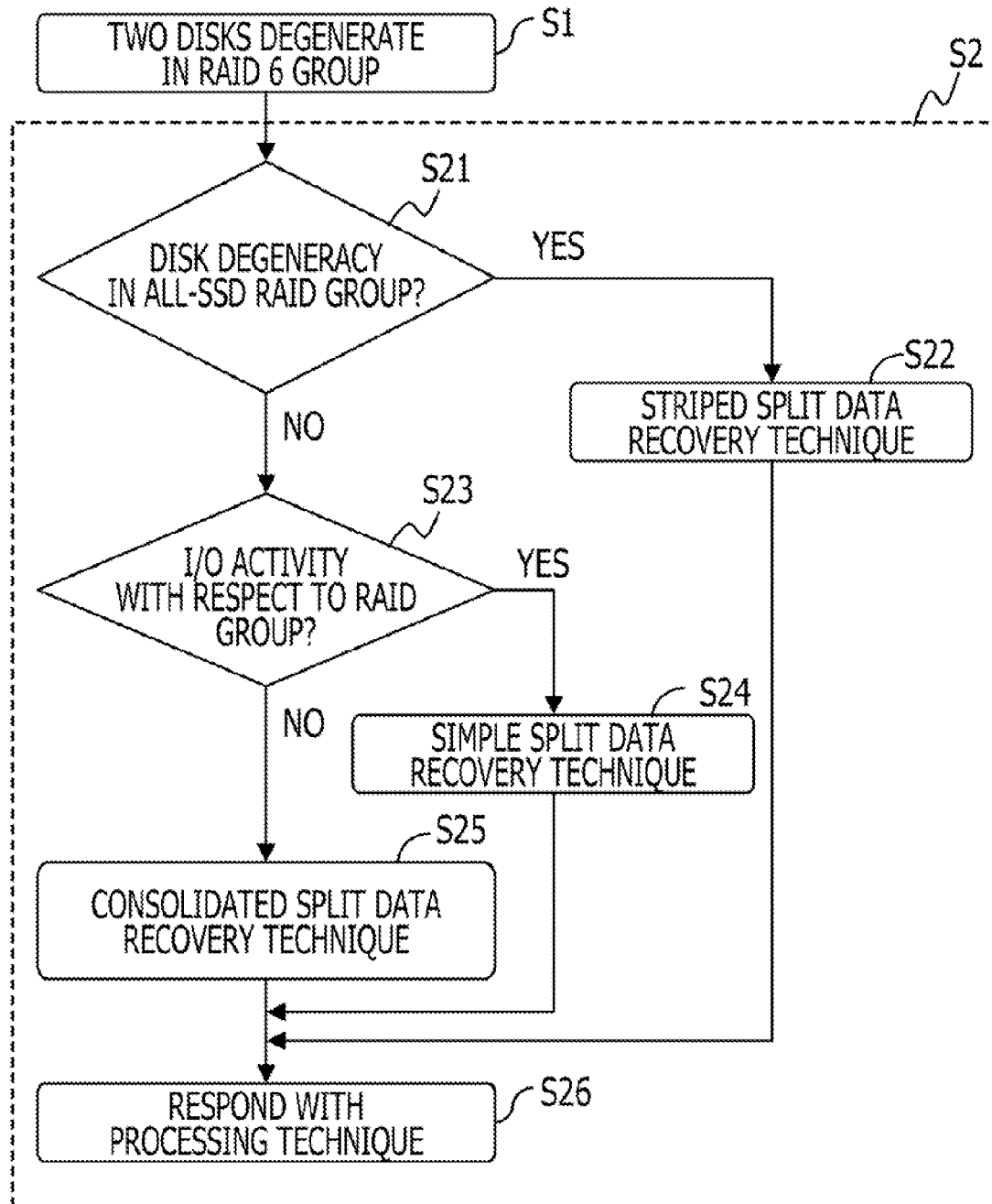
FIG. 9 is a flowchart illustrating the details of a process for automatically selecting a data recovery technique.

FIG. 9 is a flowchart illustrating the details of the process for automatically selecting a data recovery technique in S2 of FIG. 8. In FIG. 9, S21 to S26 correspond to S2. The process illustrated by the flowchart in FIG. 9 is realized by a program executed by the CPUs 212 (212-0 to 212-2), for example. In this case, the program is called as a subroutine in 51 of the flowchart in FIG. 8.

Steps in the process for automatically selecting a data recovery technique illustrated by the flowchart in FIG. 9 will now be described.

First, the CM 210 references the configuration information 216-i, and determines if the degenerate RAID 6 group is entirely made up of SSDs 233 (S21). If it is determined that the degenerate RAID 6 group is entirely SSDs 233 (S21, Yes), then the striped split data recovery technique is selected as the data recovery technique (S22), and the process transitions to S26.

In contrast, if the CM 210 determines in S21 that the disks constituting the degenerate RAID 6 group (i.e., the RAID group being processed) are not all SSDs (S21, No), then the CM 210 subsequently references the I/O management table 215, and determines whether or not I/O activity exists with respect to the RAID group (S23). If the CM 210 determines in S23 that I/O activity does exist with respect to the RAID group (S23, Yes), then the simple split data recovery technique is selected as the data recovery technique (S24), and the process transitions to S26. In contrast, if the CM 210 determines in S23 that no I/O activity exists with respect to the RAID group (S23, No), then the consolidated split data recovery technique is selected as the data recovery technique, and the process transitions to S26. Herein, S23 of the present embodiment involves determining whether or not I/O activity exists with respect to the RAID group. However, the determination processing in S23 may also be changed so as to determine whether or not a certain level of I/O activity exists with respect to the RAID group.

In S26, the CM 210 responds (to the main routine executed by the process illustrated by the flowchart in FIG. 8) with the selected data recovery technique. Subsequently, the processing in S2 of the flowchart in FIG. 8 is terminated.

{Processing Sequence for the Simple Split Data Recovery Technique}

Figure 10:
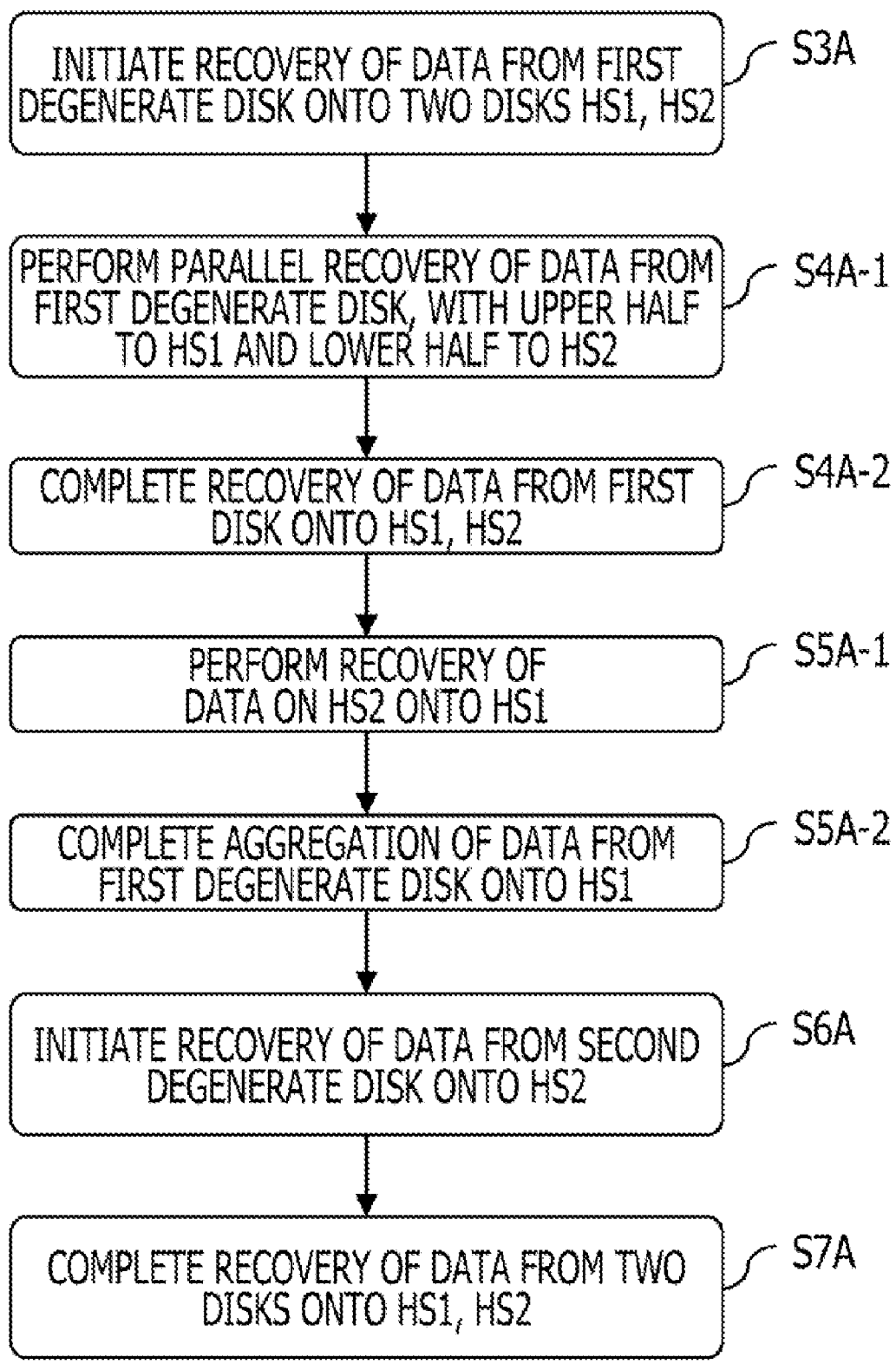
FIG. 10 is a flowchart illustrating a process for a simple split data recovery technique.

FIG. 10 is a flowchart illustrating a processing sequence for the simple split data recovery technique. The process illustrated by the flowchart in FIG. 10 corresponds to the process SA (i.e., the processing in S3 to S7) for the case when the simple split data recovery technique is selected as the data recovery technique in S2 of the flowchart in FIG. 8.

The process of the flowchart in FIG. 10 will now be described.

The CM 210 performs substantially simultaneous parallel recovery of data from the first degenerate disk, recovering the upper half of the data onto the hot spare HS1, and the lower half of the data onto the hot spare HS2 (S4A-1). As a result of the CM 210 performing the processing in S4A-1 for all data on the first degenerate disk, the process for recovering data from the first degenerate disk onto the hot spares HS1 and HS2 is completed (S4A-2).

The CM 210 performs a process to read out the data stored in the lower half of the hot spare HS2, and write the read-out data onto the lower half of the hot spare HS1 (S5A-1). The CM 210 then completes the process of aggregating all data from the first degenerate disk onto the hot spare HS1 (S5A-2).

The CM 210 initiates a process for recovering data from the second degenerate disk onto the hot spare HS2 (S6A). Subsequently, data from the second degenerate disk is recovered onto the hot spare HS2. In so doing, the data from the first degenerate disk is recovered onto the hot spare HS1, while the data from the second degenerate disk is recovered onto the hot spare HS2, thus completing the recovery of data from the two degenerate disks onto the hot spares HS1 and HS2 (S7A).

{Processing Sequence for the Consolidated Split Data Recovery Technique}

Figure 11:
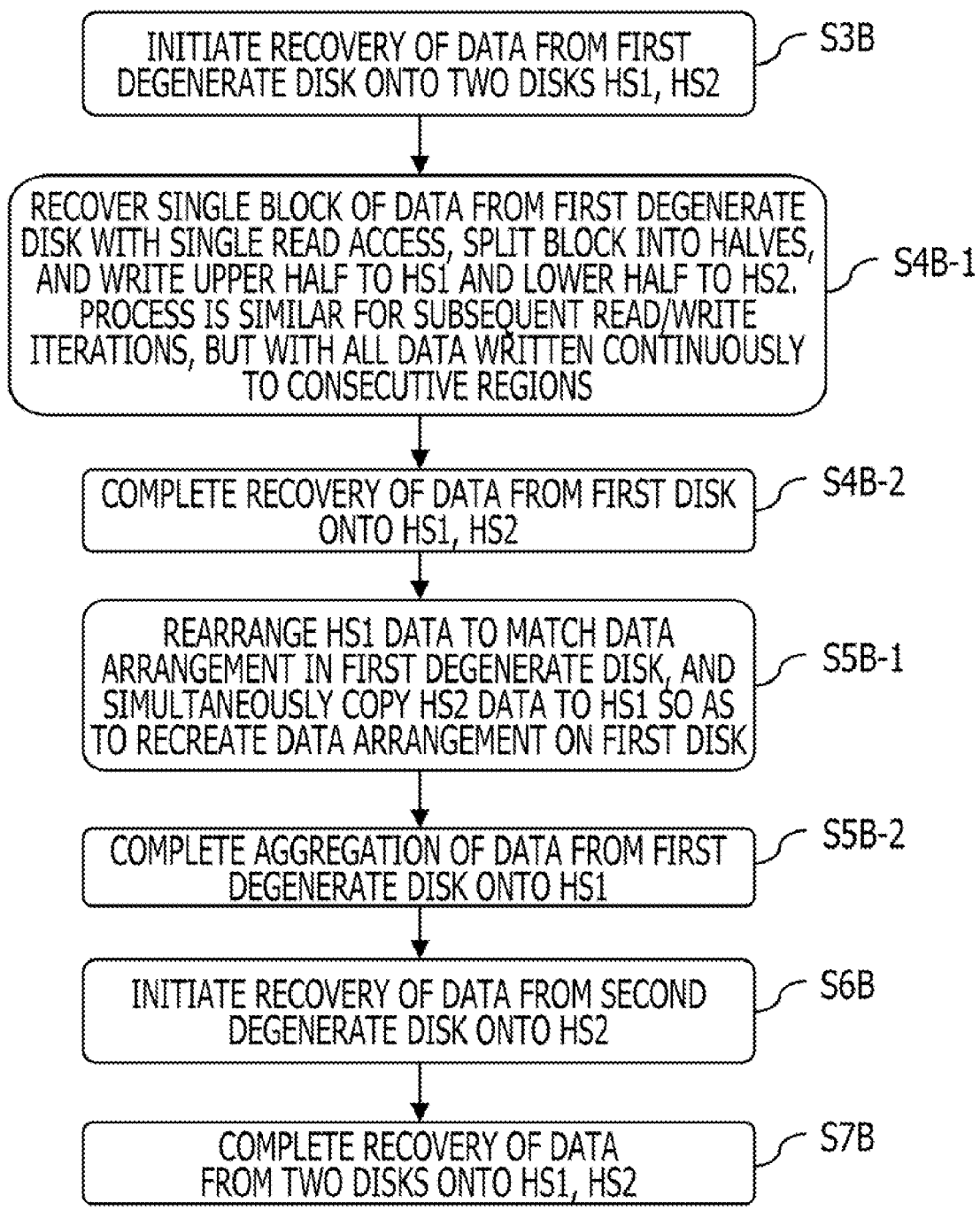
FIG. 11 is a flowchart illustrating a process for a consolidated split data recovery technique.

FIG. 11 is a flowchart illustrating a processing sequence for the consolidated split data recovery technique. The process illustrated by the flowchart in FIG. 11 corresponds to the process SA (i.e., the processing in S3 to S7) for the case when the consolidated split data recovery technique is selected as the data recovery technique in S2 of the flowchart in FIG. 8.

The process of the flowchart in FIG. 11 will now be described.

The CM 210 initiates a process for recovering data from the first degenerate disk onto the hot spares HS1 and HS2 (S3B).

Recovery of data from the first degenerate disk is conducted over one or multiple iterations. When recovering data over multiple iterations, it is necessary to read out data multiple times from the normally-operating disks in the RAID 6 group. In this case, single access data reads are performed with respect to the plurality of normally-operating disks in the RAID 6 group, but the number of data blocks read out from each healthy disk by single reads becomes double the number of stripes. The CM 210 then splits the data recovered from the first degenerate disk in the first iteration, and writes the upper half of the recovered data to the hot spare HS1, while writing the lower half to the hot spare HS2. A similar process is conducted for the recovered data in the second and subsequent iterations. The recovered data is written to the hot spares HS1 and HS2 so as to be sequentially stored in the hot spares HS1 and HS2 (S4B-1). Herein, the data on the first degenerate disk is recovered on a per-stripe basis, and on the basis of data stored in the normally-operating disks in the RAID 6 group. Consequently, the minimum block size of the recovered data in each iteration is equal to the size of a stripe. The CM 210 recovers data from the first degenerate disk on the basis of data read out in substantially simultaneous parallel from all normally-operating disks in the RAID 6 group.

By the processing in S4B-1, the CM 210 completes the process for splitting and recovering all data from the first degenerate disk onto the hot spares HS1 and HS2 (S4B-2).

Next, the CM 210 rearranges the data stored in the hot spare HS1 so as to recreate the same arrangement of data on the first degenerate disk. At this point, the CM 210 also copies the data stored on the hot spare HS1 to the hot spare HS1 so as to recreate the same arrangement of data on the first degenerate disk (S5B-2).

By the processing in S5B-2, the CM 210 completes the process for aggregating the data from the first degenerate disk onto the hot spare HS1 (S5B-2). At this stage, the data from the first degenerate disk is recovered onto the hot spare HS1.

The CM 210 initiates a process for recovering data from the second degenerate disk onto the hot spare HS2 (S6B). The CM 210 recovers all data from the second degenerate disk onto the hot spare HS2, and completes the process for recovering data from the two degenerate disks onto the hot spares HS1 and HS2 (S7B).

{Processing Sequence for the Striped Split Data Recovery Technique}

Figure 12:
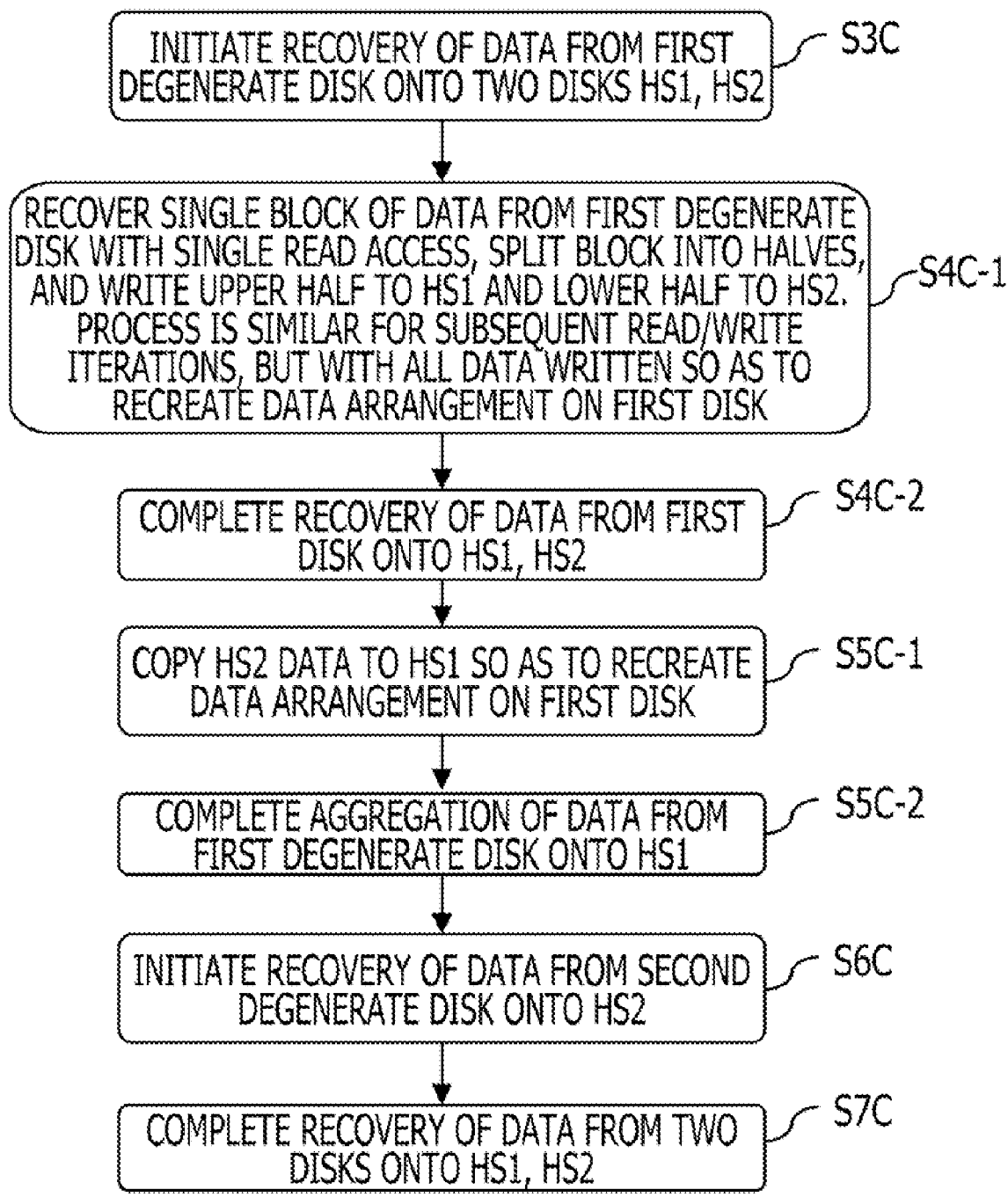
FIG. 12 is a flowchart illustrating a process for a striped split data recovery technique.
Figure 13A:
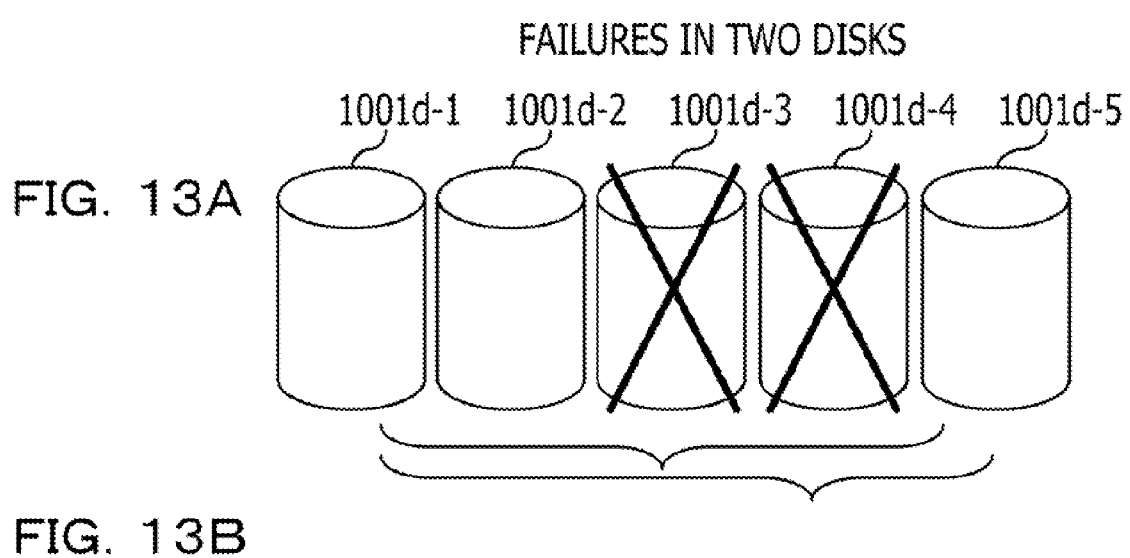
FIGS. 13A and 13B are schematic diagrams illustrating a data restoration method of the related art in the case where two disks have failed in a RAID 6 disk array.
Figure 13B:
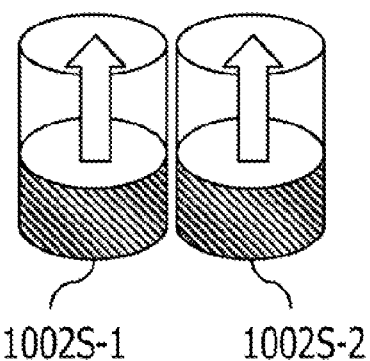

FIG. 12 is a flowchart illustrating a processing sequence for the striped split data recovery technique. The process illustrated by the flowchart in FIG. 12 corresponds to the processing in steps S3 to S7 of the flowchart in FIG. 8 for the case when the striped split data recovery technique is selected as the data recovery technique in S2 of the flowchart in FIG. 8.

The flowchart in FIG. 12 will now be described.

The CM 210 initiates a process for recovering data from the first degenerate disk onto the hot spares HS1 and HS2 (S3C).

The CM 210 splits the data recovered from the first degenerate disk in the first iteration, and writes the upper half of the recovered data to the hot spare HS1, while writing the lower half to the hot spare HS2. At this point, the recovered data is written to locations in the hot spares HS1 and HS2 that correspond to the same locations of the data on the first degenerate disk. A similar process is conducted for the recovered data in the second and subsequent iterations. The recovered data is written to the hot spares HS1 and HS2 so as to be sequentially stored in the hot spares HS1 and HS2 (S4C-1). Herein, the data on the first degenerate disk is recovered on a per-stripe basis, and on the basis of data stored in the normally-operating disks in the RAID 6 group. Consequently, the minimum block size of the recovered data in each iteration is equal to the size of a stripe. The CM 210 recovers data from the first degenerate disk on the basis of data read out in parallel from all normally-operating disks in the RAID 6 group. At this point, the block size of the data read out from a normally-operating disk in the RAID 6 by a single read command is equal to double the size of a stripe.

By the processing in S4C-1, the CM 210 completes the process for recovering all data from the first degenerate disk onto the hot spares HS1 and HS2 (S4C-2).

Next, the CM 210 copies the data stored in the hot spare HS2 to the hot spare HS1 so as to recreate the same data arrangement on the first degenerate disk (S5C-1), and aggregates the recovered data from the first degenerate disk onto the hot spare HS1 (S5C-2). At this stage, the data from the first degenerate disk is recovered onto the hot spare HS1.

Subsequently, the CM 210 initiates a process for recovering data from the second degenerate disk onto the hot spare HS2 (S6C). By recovering all data from the second degenerate disk onto the hot spare HS2, the CM 210 completes the process for recovering data from the two degenerate disks onto the hot spares HS1 and HS2 (S7C).

Advantages of the Present Embodiment

According to the disk array subsystem 20 in the present embodiment described above, at least the following advantages are obtained.

(1) When two disks fail in a RAID 6 group, recovered data from the first failed disk is written to two spare disks in parallel. For this reason, the time needed to recover data on the first failed disk can be shortened.

For this reason, it is possible to decrease the amount of time during which data loss is possible due to additional disk failures, thereby improving the reliability of the RAID 6 group. Also, it is possible to more quickly restore the RAID 6 group from a degenerate state wherein two disks have failed to a degenerate state wherein only one disk has failed (or in other words, the RAID 6 group can be quickly restored to a degenerate state with redundancy). For this reason, it is possible to decrease the amount of time during which the RAID 6 group exhibits lowered performance.

(2) The present embodiment exhibits the following advantages when compared to the method disclosed in Japanese Laid-open Patent Publication No. 2005-122338, wherein recovered data from failed disks is striped and stored in a plurality of hot spares (i.e., spare disks).

(2-1) When writing recovered data to spare disks, only a number of spare disks equal to the number of degenerate disks are used, thereby minimizing expenditure of disk resources.

(2-2) After recovering data from the first failed disk onto two spare disks, the recovered data from the first failed disk that was distributed onto the two spare disks is automatically aggregated onto one of the spare disks. For this reason, once the recovery of data from the first failed disk is complete, the RAID 6 group is restored to a performance level equivalent to the case where just that failed disk has failed.

(3) The recovery technique used when two disks have failed in a RAID 6 group can be selected from among three types of techniques: a simple split data recovery technique, a consolidated split data recovery technique, and a striped split data recovery technique. For this reason, data from the two failed disks can be recovered by always selecting the optimal recovery technique according to I/O load conditions or the types of disks constituting the RAID 6 group. In so doing, advanced data recovery performance can be provided.

The present invention is not limited to the embodiment described in the foregoing, and various modifications may be performed without departing from the scope and spirit of the present invention. For example, although the disk array subsystem 20 in FIG. 1 is a disk array that uses managed LUN control, the present invention is also applicable to disk arrays having architectures other than managed LUN control. Additionally, the technology of the present invention is limited to disk arrays having RAID 6 groups, and is also adaptable to disk arrays having RAID groups in RAID configurations able to continue degenerate operation even if three or more disks fail. This should be readily apparent to persons skilled in the art.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A disk array provided with a Redundant Array of Inexpensive Disks (RAID) group in a RAID configuration with redundancy of two or more, the disk array comprising:

a data recovery technique selecting unit to select a technique for recovering data from a first failed disk to be recovered first, the technique being selected from among a plurality of techniques based on the type of storage apparatus included in the RAID group, and I/O conditions with respect to the RAID group, when failures occur in two storage apparatus in the RAID group;

a data recovering unit to split recovered data from the first failed storage apparatus and writing the recovered data to two recovery storage apparatus in accordance with the data recovery technique selected by the data recovery technique selecting unit; and a recovered data aggregating unit to take the recovered data from the first failed storage apparatus that has been split and written to the two recovery storage apparatus, and to aggregate the recovered data onto one of the two recovery storage apparatus.

2. The disk array according to claim 1, wherein the plurality of data recovery techniques include a first data recovery technique that includes splitting recovered data from the first failed storage apparatus into an upper half and a lower half, and writing the two halves to the two recovery storage apparatus, and a second data recovery technique that includes generating recovered data from the first failed storage apparatus using single read accesses with respect to normally-operating storage apparatus belonging to the RAID group, splitting each block of recovered data thus generated into two halves, and respectively writing the two halves of the recovered data obtained by splitting to the two recovery storage apparatus.

3. The disk array according to claim 2, wherein
the first data recovery technique further includes writing the recovered data from the first failed storage apparatus to the two recovery storage apparatus such that the respective storage regions of the upper half and the lower half of the recovered data from the first failed storage apparatus do not overlap each other,
the second data recovery technique includes a technique of sequentially writing the two halves of the recovered data to continuous regions in the two recovery storage apparatus, and
when the storage apparatus included in the RAID group are hard disk drives (HDDs), the data recovery technique selecting unit selects the first data recovery technique when there is no I/O activity with respect to the RAID group, and selects the second data recovery technique when there is I/O activity with respect to the RAID group.

4. The disk array according to claim 3, wherein
the second data recovery technique includes a third data recovery technique wherein the two halves of the recovered data are written to staggered regions in the two recovery storage apparatus, and also written such that the data storage locations in the two recovery storage apparatus are respectively alternated with empty regions, and
the data recovery technique selecting unit selects the third data recovery technique when the storage apparatus included in the RAID group are solid-state drives (SSDs).

5. A data recovery method for when two storage apparatus have failed in a disk array provided with a Redundant Array of Inexpensive Disks (RAID) group in a RAID configuration with redundancy of two or more, the method comprising:
selecting a technique for recovering data from a first failed disk to be recovered first, the technique being selected from among a plurality of techniques based on the type of disks included in the RAID group, and I/O conditions with respect to the RAID group, when failures occur in two storage apparatus in the RAID group;
splitting recovered data from the first failed storage apparatus and writing the recovered data to two recovery storage apparatus in accordance with the data recovery technique selected in the data recovery technique selecting step; and
taking the recovered data from the first failed storage apparatus that has been split and written to the two recovery storage apparatus in the data recovering step, and aggregating the recovered data onto one of the two recovery storage apparatus.

6. The data recovery method for a disk array according to claim 5, wherein the plurality of data recovery techniques includes
a first data recovery technique that includes splitting recovered data from the first failed storage apparatus into an upper half and a lower half, and writing the two halves to the two recovery storage apparatus, and
a second data recovery technique that includes generating recovered data from the first failed storage apparatus using single read accesses with respect to normally-operating storage apparatus belonging to the RAID group, splitting each block of recovered data thus generated into two halves, and respectively writing the two halves of the recovered data obtained by splitting to the two recovery storage apparatus.

7. The data recovery method for a disk array according to claim 6, wherein
the first data recovery technique further includes writing the recovered data from the first failed storage apparatus to the two recovery storage apparatus such that the respective storage regions of the upper half and the lower half of the recovered data from the first failed storage apparatus do not overlap each other,
the second data recovery technique includes a technique of sequentially writing the two halves of the recovered data to continuous regions in the two recovery storage apparatus, and
the selecting a technique for recovering data includes, when the storage apparatus included in the RAID group are hard disk drives (HDDs), selecting the first data recovery technique when there is no I/O activity with respect to the RAID group, and selecting the second data recovery technique when there is I/O activity with respect to the RAID group.

8. The data recovery method for a disk array according to claim 6, wherein
the second data recovery technique includes a third data recovery technique wherein the two halves of the recovered data are written to staggered regions in the two recovery storage apparatus, and also written such that the data storage locations in the two recovery storage apparatus are respectively alternated with empty regions; and
the selecting a technique for recovering data includes selecting the third data recovery technique when the storage apparatus included in the RAID group are solid-state drives (SSDs).

9. A non-transitory computer-readable recording medium storing instructions for performing, when executed by a processor, a data recovery process for when two storage apparatus have failed in a disk array provided with a Redundant Array of Inexpensive Disks (RAID) group in a RAID configuration with redundancy of two or more, the method comprising:
selecting a technique for recovering data from a first failed disk to be recovered first, the technique being selected from among a plurality of techniques based on the type of disks included in the RAID group, and I/O conditions with respect to the RAID group, when failures occur in two storage apparatus in the RAID group;
splitting recovered data from the first failed storage apparatus and writing the recovered data to two recovery storage apparatus in accordance with the data recovery technique selected in the data recovery technique selecting step; and
taking the recovered data from the first failed storage apparatus that has been split and written to the two recovery storage apparatus in the data recovering step, and aggregating the recovered data onto one of the two recovery storage apparatus.

10. The computer-readable recording medium according to claim 9, wherein the plurality of data recovery techniques includes
a first data recovery technique that includes splitting recovered data from the first failed storage apparatus into an upper half and a lower half, and writing the two halves to the two recovery storage apparatus, and
a second data recovery technique that includes generating recovered data from the first failed storage apparatus using single read accesses with respect to normally-operating storage apparatus belonging to the RAID group, splitting each block of recovered data thus generated into two halves, and respectively writing the two halves of the recovered data obtained by splitting to the two recovery storage apparatus.

11. The computer-readable recording medium according to claim 10, wherein
the first data recovery technique further includes writing the recovered data from the first failed storage apparatus to the two recovery storage apparatus such that the respective storage regions of the upper half and the lower half of the recovered data from the first failed storage apparatus do not overlap each other,
the second data recovery technique includes a technique of sequentially writing the two halves of the recovered data to continuous regions in the two recovery storage apparatus, and
in the data recovery technique selecting step, in the case where the storage apparatus included in the RAID group are hard disk drives (HDDs), the first data recovery technique is selected when there is no I/O activity with respect to the RAID group, and the second data recovery technique is selected when there is I/O activity with respect to the RAID group.

12. The computer-readable recording medium according to claim 10, wherein
the second data recovery technique includes a third data recovery technique wherein the two halves of the recovered data are written to staggered regions in the two recovery storage apparatus, and also written such that the data storage locations in the two recovery storage apparatus are respectively alternated with empty regions, and
the selecting a technique for recovering data includes selecting the third data recovery technique when the storage apparatus included in the RAID group are solid-state drives (SSDs).

* * * * *